(12) United States Patent (10) Patent No.: US 8,798,476 B2
Gloeckner et al. (45) Date of Patent: Aug. 5, 2014

(54) METHOD AND SYSTEM FOR SINGLE LASER BIDIRECTIONAL LINKS

(75) Inventors: Steffen Gloeckner, San Diego, CA (US); Peter De Dobbelaere, San Diego, CA (US); Attila Mekis, Carlsbad, CA (US)

(73) Assignee: Luxtera, Inc., Carlsbad, CA (US)

( * ) Notice: Subject to any disclaimer, the term of this patent is extended or adjusted under 35 U.S.C. 154(b) by 683 days.

(21) Appl. No.: 12/708,496

(22) Filed: Feb. 18, 2010

(65) Prior Publication Data

US 2010/0209114 A1 Aug. 19, 2010

Related U.S. Application Data

(60) Provisional application No. 61/207,958, filed on Feb. 18, 2009.

(51) Int. Cl.
*H04B 10/00* (2013.01)
*H04B 10/12* (2006.01)
*H04B 10/04* (2006.01)
*H04B 10/06* (2006.01)

(52) U.S. Cl.
USPC ........... 398/140; 398/141; 398/164; 398/168; 398/182; 398/202

(58) Field of Classification Search
None
See application file for complete search history.

(56) References Cited

U.S. PATENT DOCUMENTS

| | | | | | |
|---|---|---|---|---|---|
| 5,408,350 | A | * | 4/1995 | Perrier et al. | 398/168 |
| 5,886,803 | A | * | 3/1999 | Yamamoto et al. | 398/41 |
| 6,163,632 | A | * | 12/2000 | Rickman et al. | 385/14 |
| 6,266,171 | B1 | * | 7/2001 | Gehlot | 398/161 |
| 7,251,386 | B1 | * | 7/2007 | Dickinson et al. | 385/14 |
| 2006/0280405 | A1 | * | 12/2006 | Gunn et al. | 385/37 |

* cited by examiner

*Primary Examiner* — Darren E Wolf
(74) *Attorney, Agent, or Firm* — McAndrews, Held & Malloy (57) ABSTRACT

A method and system for single laser bidirectional links are disclosed and may include communicating a high speed optical signal from a transmit CMOS photonics chip to a receive CMOS photonics chip and communicating a low-speed optical signal from the receive CMOS photonics chip to the transmit CMOS photonics chip via one or more optical fibers. The optical signals may be coupled to and from the CMOS photonics chips utilizing single-polarization grating couplers. The optical signals may be coupled to and from the CMOS photonics chips utilizing polarization-splitting grating couplers. The optical signals may be amplitude or phase modulated. The optical fibers may comprise single-mode or polarization-maintaining fibers. A polarization of the high-speed optical signal may be configured before communicating it over the single-mode fibers. The low-speed optical signal may be generated by modulating the received high-speed optical signal or from a portion of the received high-speed optical signal.

22 Claims, 11 Drawing Sheets

METHOD AND SYSTEM FOR SINGLE LASER BIDIRECTIONAL LINKS

CROSS-REFERENCE TO RELATED APPLICATIONS/INCORPORATION BY REFERENCE

This application makes reference to and claims priority to U.S. Provisional Application Ser. No. 61/207,958 filed on Feb. 18, 2009, which is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to signal processing. More specifically, certain embodiments of the invention relate to a method and system for single laser bidirectional links.

BACKGROUND OF THE INVENTION

As data networks scale to meet ever-increasing bandwidth requirements, the shortcomings of copper data channels are becoming apparent. Signal attenuation and crosstalk due to radiated electromagnetic energy are the main impediments encountered by designers of such systems. They can be mitigated to some extent with equalization, coding, and shielding, but these techniques require considerable power, complexity, and cable bulk penalties while offering only modest improvements in reach and very limited scalability. Free of such channel limitations, optical communication has been recognized as the successor to copper links.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for integrated control system for single laser bidirectional links, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for single laser bidirectional links. Exemplary aspects of the invention may comprise communicating a high speed optical signal from a transmit CMOS photonics chip to a receive CMOS photonics chip and communicating a low-speed optical signal from the receive CMOS photonics chip to the transmit CMOS photonics chip via one or more optical fibers. The optical signals may be coupled to and from the CMOS photonics chips utilizing single-polarization grating couplers. The optical signals may be coupled to and from the CMOS photonics chips utilizing polarization-splitting grating couplers. The optical signals may be amplitude modulated or phase modulated. The one or more optical fibers may comprise single-mode fibers or polarization-maintaining fibers. A polarization state of the light carrying the high-speed optical signal may be configured before and/or while communicating the high-speed optical signal over the single-mode fibers. The low-speed optical signal may be generated by modulating the received high-speed optical signal of from a portion of the received high-speed optical signal.

Figure 1A:
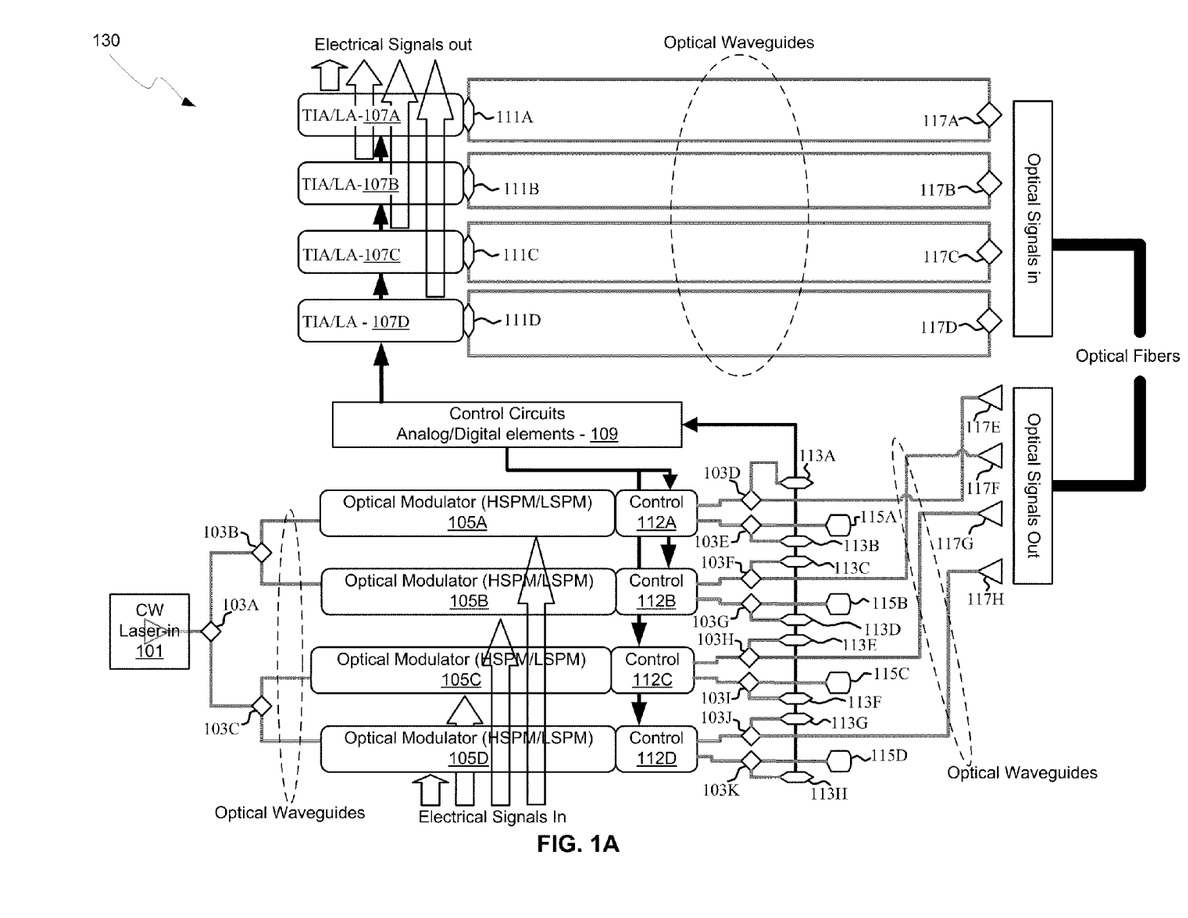
FIG. 1A is a block diagram of a photonically enabled CMOS chip, in accordance with an embodiment of the invention.

FIG. 1A is a block diagram of a photonically enabled CMOS chip, in accordance with an embodiment of the invention. Referring to FIG. 1A, there is shown optoelectronic devices on a CMOS chip 130 comprising optical modulators 105A-105D, high-speed photodiodes 111A-111D, monitor photodiodes 113A-113H, and optical devices comprising taps 103A-103K, optical terminations 115A-115D, and grating couplers 117A-117H. There is also shown electrical devices and circuits comprising transimpedance and limiting amplifiers (TIA/LAs) 107A-107D, analog and digital control circuits 109, and control sections 112A-112D. Optical signals are communicated between optical and optoelectronic devices via optical waveguides fabricated in the CMOS chip 130.

The optical modulators 105A-105D comprise Mach-Zehnder or ring modulators, for example, and enable the modulation of the CW laser input signal. The optical modulators 105A-105D comprise high-speed and low-speed phase modulation sections and are controlled by the control sections 112A-112D. The high-speed phase modulation section of the optical modulators 105A-105D may modulate a CW light source signal with a data signal. The low-speed phase modulation section of the optical modulators 105A-105D may compensate for slowly varying phase factors such as those induced by mismatch between the waveguides, waveguide temperature, or waveguide stress and is referred to as the passive phase, or the passive biasing of the MZI.

This mismatch between the waveguides may be intentional, such as in an imbalanced MZI, but is often unintentional in a nominally balanced MZI due to small imperfections in waveguide fabrication. The phase modulators then have a dual role: to compensate for the passive biasing of the MZI and to apply the additional phase modulation used to modulate the light intensity at the output port of the MZI according to a data stream. The former phase tuning and the latter phase modulation may be applied by separate, specialized devices, since the former is a low speed, slowly varying contribution, while the latter is typically a high speed signal. These devices are then respectively referred to as the LSPM and the HSPM. Examples for LSPM are thermal phase modulators (TPM), where a waveguide portion is locally heated up to modify the index of refraction of its constituting materials, or forward biased PIN junctions (PINPM) where current injection into the PIN junction modifies the carrier density, and thus the index of refraction of the semiconductor material. An example of HSPM is a reversed biased PIN junction, where the index of refraction is also modulated via the carrier density, but which allows much faster operation, albeit at a lower phase modulation efficiency per waveguide length.

The outputs of the modulators are optically coupled via waveguides to the grating couplers 117E-117H. The taps 103D-103K comprise four-port optical couplers, for example, and are utilized to sample the optical signals generated by the optical modulators 105A-105D, with the sampled signals being measured by the monitor photodiodes 113A-113H. The unused branches of the taps 103D-103K are terminated by optical terminations 115A-115D to avoid back reflections of unwanted signals.

The grating couplers 117A-117H comprise optical gratings that enable coupling of light into and out of the CMOS chip 130. The grating couplers 117A-117D are utilized to couple light received from optical fibers into the CMOS chip 130, and the grating couplers 117E-117H are utilized to couple light from the CMOS chip 130 into optical fibers. The grating couplers 117A-117H may comprise single polarization grating couplers (SPGC) and/or polarization splitting grating couplers (PSGC). In instances where a PSGC is utilized, two input, or output, waveguides may be utilized.

The optical fibers may be epoxied, for example, to the CMOS chip, and may be aligned at an angle from normal to the surface of the CMOS chip 130 to optimize coupling efficiency. In an embodiment of the invention, the optical fibers may comprise single-mode fiber (SMF) and/or polarization-maintaining fiber (PMF). By integrating CMOS chips at each end of the optical fibers, a bidirectional link is enabled that may only require a single laser. In another embodiment of the invention, a single laser and a single fiber may be utilized to configure a bidirectional link. This may be enabled by using a PSGC, where two optical signals may be launched into the same fiber, for example.

The high-speed photodiodes 111A-111D convert optical signals received from the grating couplers 117A-117D into electrical signals that are communicated to the TIA/LAs 107A-107D for processing. The analog and digital control circuits 109 may control gain levels or other parameters in the operation of the TIA/LAs 107A-107D. The TIA/LAs 107A-107D then communicate electrical signals off the CMOS chip 130.

The control sections 112A-112D comprise electronic circuitry that enable modulation of the CW laser signal received from the splitters 103A-103C. The optical modulators 105A-105D require high-speed electrical signals to modulate the refractive index in respective branches of a Mach-Zehnder interferometer (MZI), for example. In an embodiment of the invention, the control sections 112A-112D may include sink and/or source driver electronics that may enable a bidirectional link utilizing a single laser.

In operation, a laser source may act as optical power supply and the light coupled from the laser into the chip may be utilized to generate a high-speed modulated downlink signal. The other side of the bidirectional link, the sink, may receive the high-speed modulated optical signal and utilize the signal to generate a low-speed optical signal to be launched back towards the source side of the link. This is described further with respect to FIGS. 2-10.

Figure 1B:
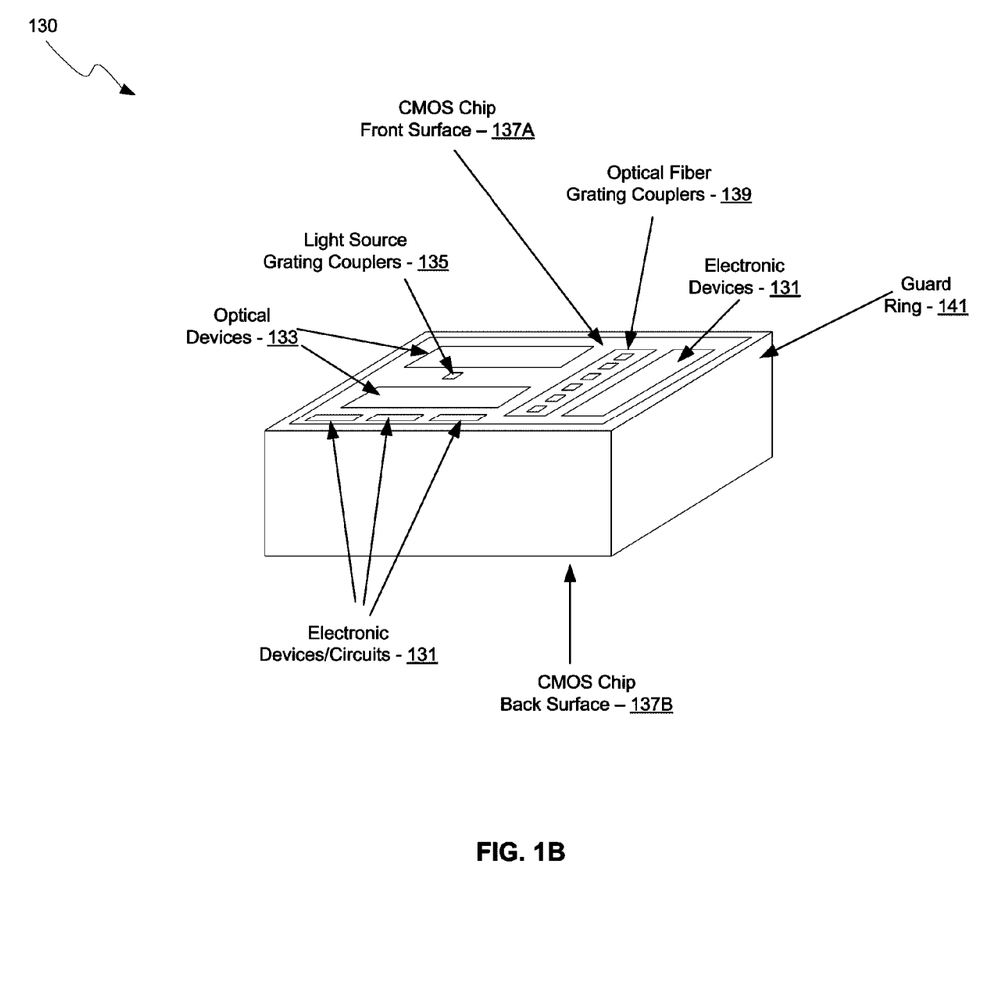
FIG. 1B is a diagram illustrating an exemplary CMOS chip, in accordance with an embodiment of the invention.

FIG. 1B is a diagram illustrating an exemplary CMOS chip, in accordance with an embodiment of the invention. Referring to FIG. 1B, there is shown the CMOS chip 130 comprising electronic devices/circuits 131, optical and optoelectronic devices 133, a light source interface 135, CMOS chip front surface 137A, CMOS chip back surface 137B, an optical fiber interface 139, and CMOS guard ring 141.

The light source interface 135 and the optical fiber interface 139 comprise grating couplers that enable coupling of light signals via the CMOS chip surface 137, as opposed to the edges of the chip as with conventional edge-emitting devices. Coupling light signals via the CMOS chip surface 137 enables the use of the CMOS guard ring 141 which protects the chip mechanically and prevents the entry of contaminants via the chip edge.

The electronic devices/circuits 131 comprise circuitry such as the TIA/LAs 107A-107D and the analog and digital control circuits 109 described with respect to FIG. 1A, for example. The optical and optoelectronic devices 133 comprise devices such as the taps 103A-103K, optical terminations 115A-115D, grating couplers 117A-117H, optical modulators 105A-105D, high-speed photodiodes 111A-111D, and monitor photodiodes 113A-113H.

In an embodiment of the invention, an optical source, such as a laser source assembly and optical fibers, may be utilized to configure a bidirectional link with a single laser source. By coupling a chip similar to the CMOS chip 130 to the other end of one or more optical fibers, a bidirectional link may be enabled with a single laser at the source side of the link.

Figure 1C:
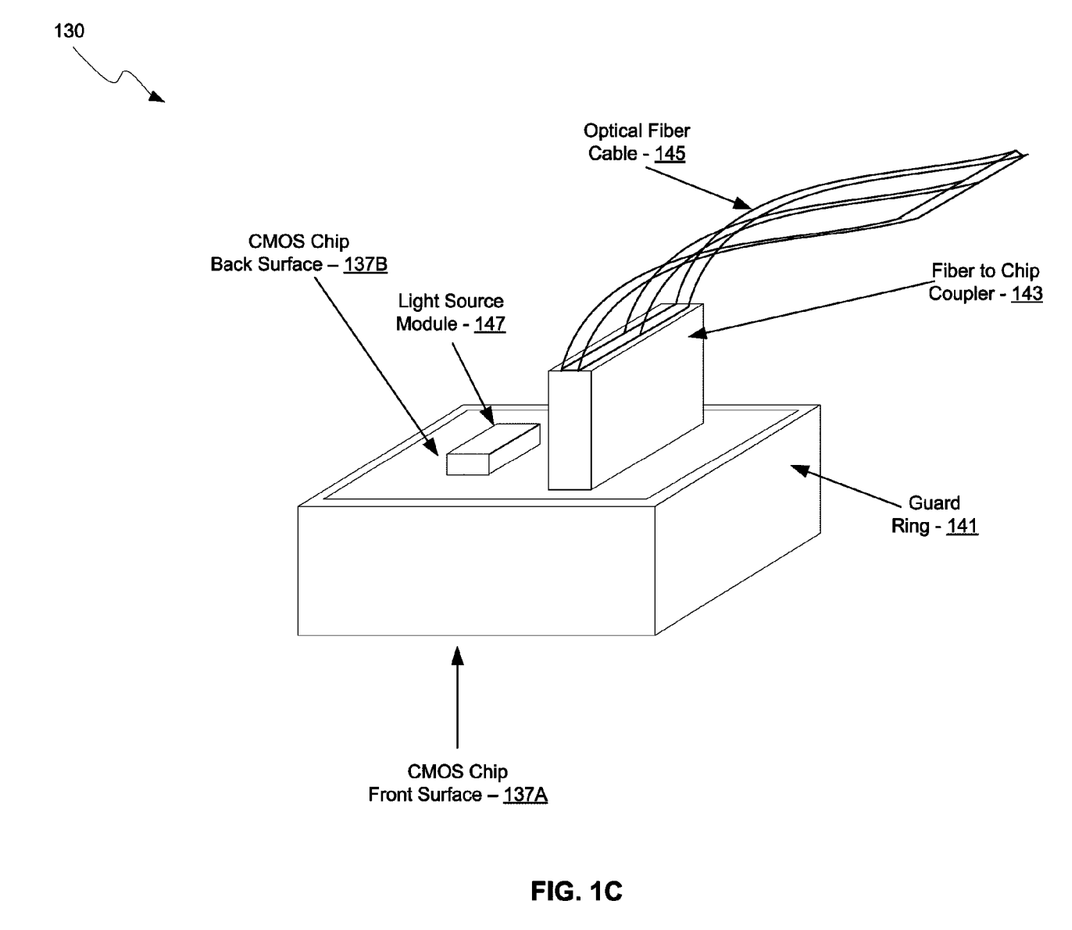
FIG. 1C is a diagram illustrating an exemplary CMOS chip coupled to an optical fiber cable, in accordance with an embodiment of the invention.

FIG. 1C is a diagram illustrating an exemplary CMOS chip coupled to an optical fiber cable, in accordance with an embodiment of the invention. Referring to FIG. 1C, there is shown the CMOS chip 130 comprising the CMOS chip front surface 137A, the CMOS chip back surface 137B, and the CMOS guard ring 141. There is also shown a fiber-to-chip coupler 143, an optical fiber cable 145, and an optical source assembly 147.

The CMOS chip 130 comprising the electronic devices/circuits 131, the optical and optoelectronic devices 133, the light source interface 135, the CMOS chip surface 137, and the CMOS guard ring 141 may be as described with respect to FIG. 1B.

In an embodiment of the invention, the optical fiber cable may be affixed, via epoxy for example, to the CMOS chip back surface 137B. The fiber chip coupler 143 enables the physical coupling of the optical fiber cable 145 to the CMOS chip 130, and may enable a bidirectional link using one laser source.

Figure 2:
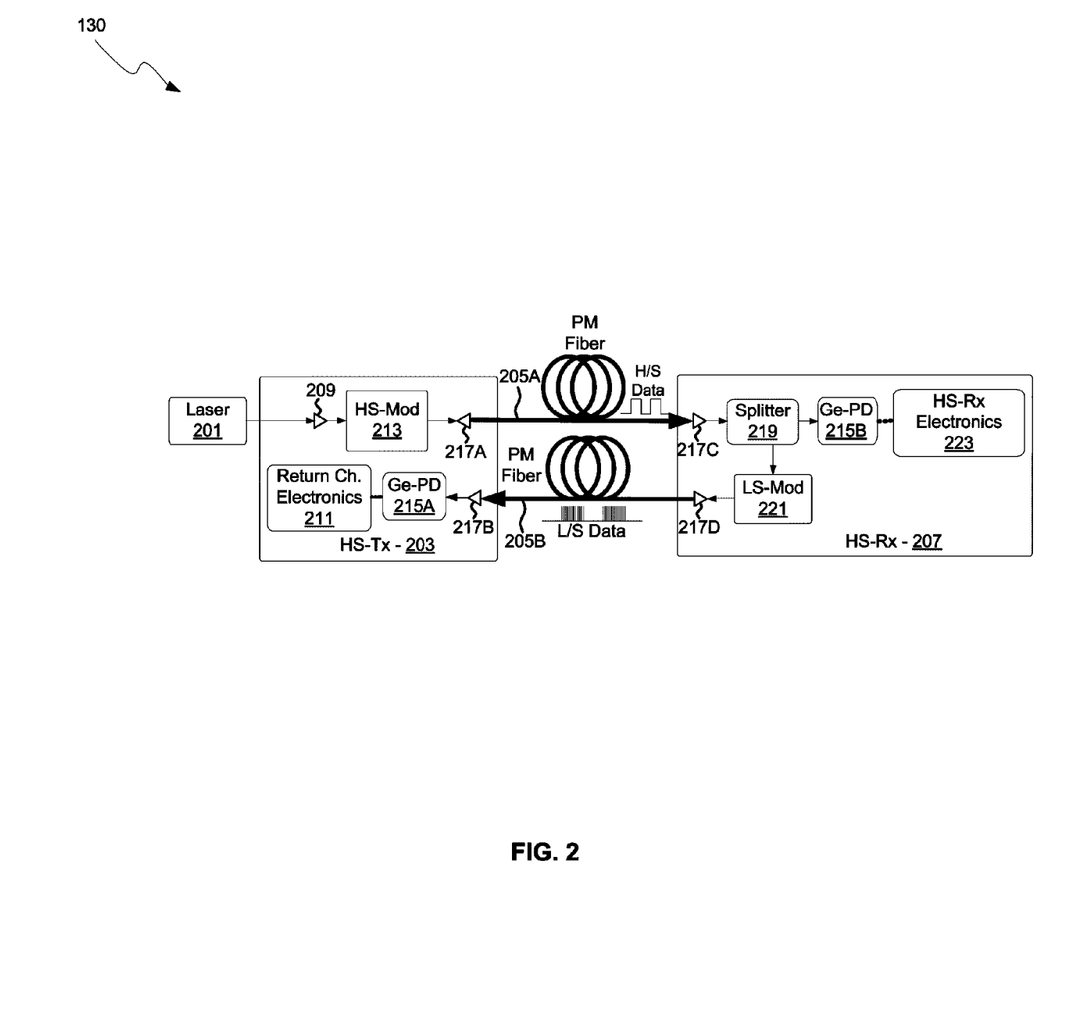
FIG. 2 is a block diagram of a single laser bidirectional link with two polarization-maintaining fibers, in accordance with an embodiment of the invention.

FIG. 2 is a block diagram of a single laser bidirectional link with two polarization-maintaining fibers, in accordance with an embodiment of the invention. Referring to FIG. 2, there is shown a laser 201, a high-speed transmit module 203, polarization-maintaining fibers 205A and 205B, and a high-speed receive module 207. Each of the modules may be integrated on a separate CMOS photonics chip.

The high-speed transmit module 203 comprises a grating coupler 209, a return channel receive electronics module 211, a high-speed modulator 213, a photodiode 215A, and grating couplers 217A and 217B. The high-speed receive module 207 comprises grating couplers 217C and 217D, a splitter 219, a low-speed modulator 221, a photodiode 215B, and high-speed receive electronics module 223.

The grating couplers 209 and 217A-217D may be substantially similar to the grating couplers 117A-117H described with respect to FIG. 1A. In an exemplary embodiment of the invention the grating couplers 209 and 217A-217D comprise single polarization grating couplers.

The high-speed modulator 213 and the low-speed modulator 221 may be substantially similar to the optical modulators 105A-105D described with FIG. 1A and may be operable to modulate optical signals. The high-speed modulator 213 may be operable to modulate the optical received from the laser 201 via the grating coupler 209 and may comprise a reverse-biased high-speed diode configuration, for example. The low-speed modulator 221 may be operable to modulate an optical received from the splitter 219 and may comprise a forward-biased diode modulator configuration, for example.

The photodiodes 215A and 215B comprise germanium photodiodes (Ge-PD), for example, and may be operable to detect received optical signals. For example, the Ge-PD 215A may be operable to detect low-speed modulated optical signals received from the polarization-maintaining fiber 205B via the grating coupler 217B. Similarly, the Ge-PD 215B may be operable to detect optical signals received from the polarization-maintaining fiber 205A.

The polarization-maintaining fibers 205A and 205B may comprise optical fibers that are configured to maintain the polarization of a received optical signal at one end and output a signal with the same or similar polarization. This is in contrast to conventional single-mode fibers that may vary the polarization of the optical signal as it traverses the length of the fiber. By utilizing polarization-maintaining fibers, single polarization grating couplers may be utilized to couple signals into the Tx and Rx modules.

The splitter 219 comprises an optical splitter that splits off a percentage of an incoming optical signal to provide two output signals. In this manner, the optical signal received from the grating coupler 217C may be split into two components, one communicated to the low-speed modulator 221 and the other to the Ge-PD 215B.

The high-speed receive electronics module 223 comprises circuitry that may be operable to extract data from a signal received from the Ge-PD 215B. The high-speed receive electronics module 223 may be integrated on the same CMOS chip, such as the CMOS chip 130, as the optical and optoelectronic devices of the high-speed Rx module 207.

In operation, the laser 201 may communicate an optical signal to the CMOS chip comprising the Tx optical, optoelectronic, and electronic devices of the high-speed Tx module 203 via the grating coupler 209. The received optical signal may be modulated utilizing the high-speed modulator 213, thereby incorporating data into the optical signal and generating a high-speed data signal. The high speed data signal may be communicated from the high-speed Tx module 203 to the high-speed Rx module 207 via the polarization-maintaining fiber 205A.

The grating coupler 217C may couple the received high-speed data signal to the splitter 219, which may couple a portion of the received signal to the low-speed modulator 221 and the remaining signal to the Ge-PD 215B. The Ge-PD 215B may convert the received optical signal into an electrical signal that may be received and processed by the high-speed Rx electronics module 223. In this manner, data may be communicated at high data rates from the high-speed Tx module 203 to the high-speed Rx module 207.

The low-speed modulator 221 may receive the high-speed data signal from the splitter 219 and modulate a low-speed data signal over the high-speed data signal, thereby generating a low-speed data signal. The low-speed data signal therefore comprises periods of bursts (1's) and no bursts (0's), and may be communicated to the polarization-maintaining fiber 205B via the grating coupler 217D.

The low-speed data signal may then be communicated from the high-speed Rx module 207 to the high-speed Tx module 203. The low-speed data signal may be coupled into the high-speed Tx module 203 via the grating coupler 217B and converted to an electrical signal by the Ge-PD 215A. The electrical signal generated by the Ge-PD 215A may be communicated to the return channel electronics module 211 for processing thereby generating a bidirectional link utilizing a single laser, the laser 201, and two polarization-maintaining fibers 205A and 205B.

Figure 3:
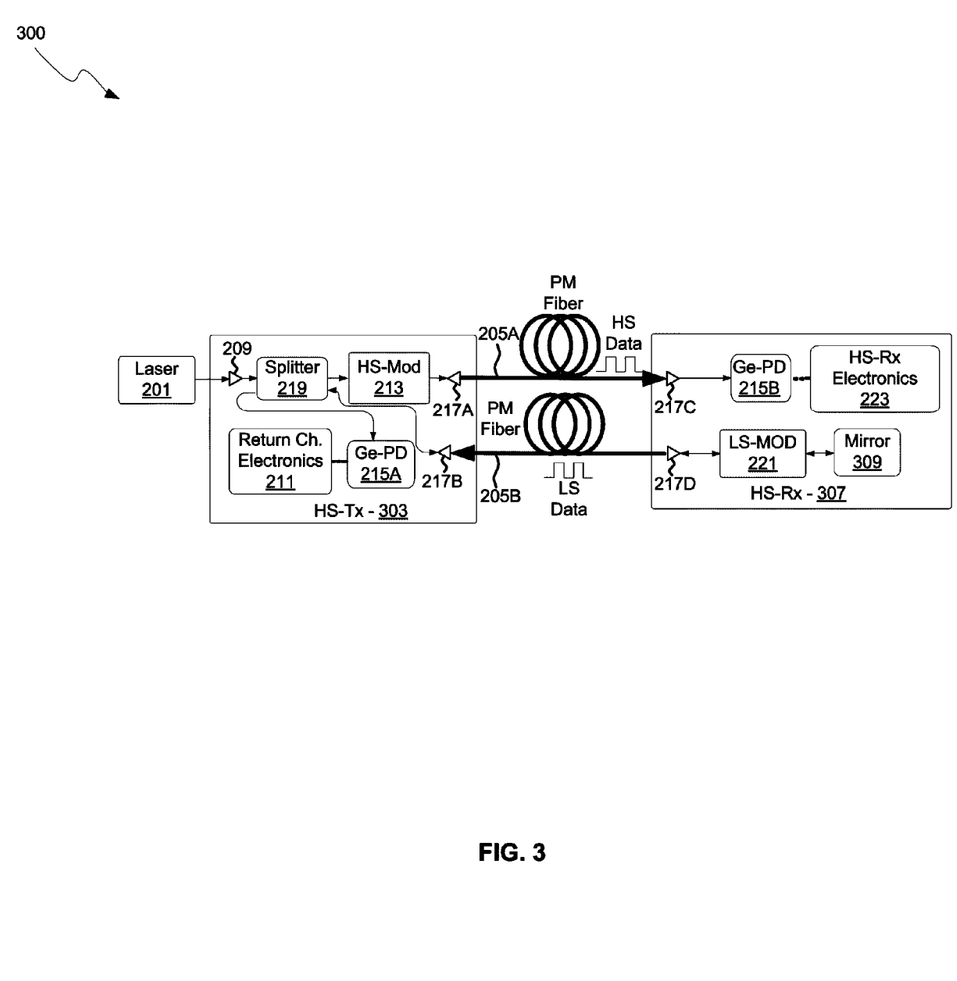
FIG. 3 is a block diagram of a single laser bidirectional link with two polarization-maintaining fibers, in accordance with an embodiment of the invention.

FIG. 3 is a block diagram of a single laser bidirectional link with two polarization-maintaining fibers, in accordance with an embodiment of the invention. Referring to FIG. 3, there is shown the laser 201, a high-speed Tx module 303, and a high-speed Rx module 307, which may be similar to the high- and low-speed modulators described with respect to FIG. 2, but with additional components. Each of the modules may be integrated on a separate CMOS photonics chip.

For example, the splitter 219, which comprises a four-port splitter in this exemplary embodiment, may be placed in the high-speed Rx module 303 following the grating coupler 219. In this manner, an unmodulated optical signal may be utilized for the low-speed data signal communicated from the high-speed Rx module 307 to the high-speed Tx module 303. In addition, the mirror 309 may be added to the high-speed Rx module 307. The mirror 309 may comprise a Sagnac loop, which may further comprise a 1×2 waveguide splitter with the outputs coupled so that the received optical signal may be split, travel around each length of the loop and back to the input, thereby mirroring the received signal, which may be communicated back to the low-speed modulator 221.

In operation, a NRZ-return signal may be provided for the low-speed data signal by tapping a portion of unmodulated light off the source side utilizing the splitter 219. A portion of the light split by the splitter 219 may be modulated by the high-speed modulator 213, thereby generating a high-speed data signal that may be coupled to the polarization-maintaining fiber 205A via the grating coupler 217A. The high-speed data signal may be communicated from the high-speed Tx module 303 via the polarization-maintaining fiber 205A, and coupled into the high-speed Rx module 307 via the grating coupler 217C. The received optical signal may then be converted to an electrical signal by the Ge-PD 215B for processing by the high-speed Rx electronics module 223.

The remaining portion of the optical signal split off by the splitter 219 from the optical signal received from the grating coupler 209 may be communicated to the grating coupler 217B, which may couple the CW optical signal to the polarization-maintaining fiber 205B for transmission to the high-speed Rx module 307. The optical signal may be coupled into the high-speed Rx module 307 via the grating coupler 217D and communicate the CW optical signal to the low-speed modulator 221. The low-speed modulated signal may be communicated to the mirror 309, which may reflect the signal back to the low-speed modulator 221 for further modulation, thereby generating a low-speed data signal.

This two-pass configuration may result in higher modulation efficiency by the low-speed modulator 221. This low-speed data signal may be coupled back into the polarization-maintaining fiber 205B by the grating coupler 217D and communicated to the high-speed Tx module 303. The low-speed data signal may be coupled into the high-speed Tx module 303 by the grating coupler 217B.

The low-speed data signal may be communicated to the splitter 219, thereby providing the two-way path for the CW signal to be supplied to the high-speed Rx module 307 and the low-speed data signal to be communicated back to the high-speed Tx module 303. The splitter 219 may be a directional device, such that most or all of the low-speed data signal received from the grating coupler 217B may be communicated to the Ge-PD 215A, which may convert the received low-speed data signal into an electrical signal for communication to the return channel electronics module 211, thereby configuring a bidirectional link utilizing a single laser source.

Figure 4:
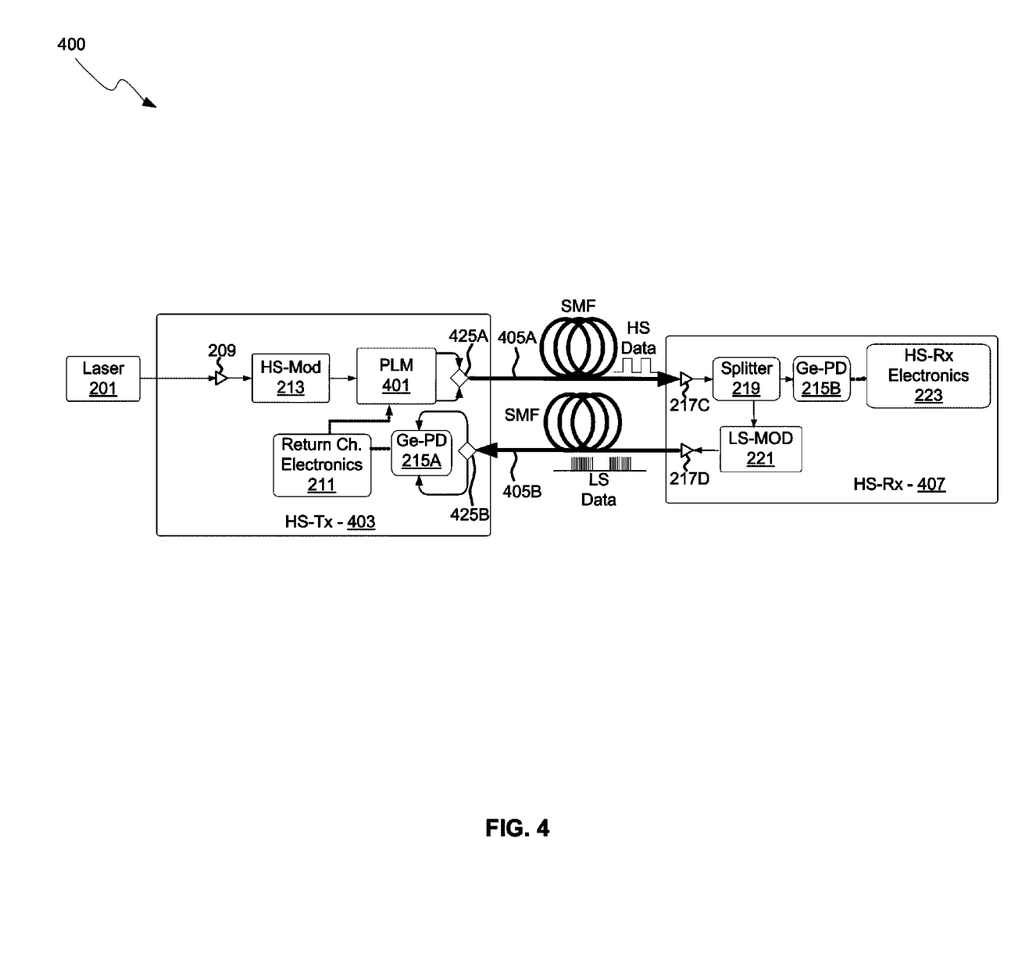
FIG. 4 is a block diagram of a single laser bidirectional link with two single-mode fibers, in accordance with an embodiment of the invention.

FIG. 4 is a block diagram of a single laser bidirectional link with two single-mode fibers, in accordance with an embodiment of the invention. Referring to FIG. 4, there is shown the laser 201, high-speed Tx module 403, single-mode fibers 405A and 405B, and a high-speed Rx module 407. The high-speed Tx and Rx modules 403 and 407 may be substantially similar to the high-speed Tx and Rx modules described with respect to FIGS. 2 and 3 but with added components. The grating couplers 209, 217C, and 217D, the high-speed modulator 213, the Ge-PDs 215A and 215B, the splitter 219, the low-speed modulator 221, and the high-speed Rx electronics module 223 may be substantially as described previously.

The high-speed Tx module 403 also comprises a polarization launch manager 401, and polarization splitting grating couplers 425A and 425B. The polarization launch manager 401 comprises an interferometer, for example, cascaded MZIs (Mach-Zehnder interferometers) with phase modulators in the interferometer arms, with 2 output ports. The 2 outputs may be actively controlled in amplitude and phase and coupling the outputs to the 2-port polarization splitting grating coupler 425A and into a single-mode fiber thereby interfering the 2 signals enables the active configuration of the polarization state of the launched optical signal.

In operation, a CW optical signal may be communicated to the high-speed Tx module 403 via the grating coupler 209. The received optical signal may be modulated by the high-speed modulator 213 and the resulting high-speed data signal may be communicated to the polarization launch manager 401, which may split the received optical into two paths and control the phase of the light in the two paths. The two output signals of the polarization launch manager 401 may be communicated to the polarization-splitting grating coupler 425A for coupling to the single-mode fiber 405A.

As the light is coherent, the two light beams will interfere and create an uncontrolled polarization state on the Poincare-sphere at the single-polarization grating coupler 217C. A polarization state may be launched from the high-speed Tx module 403 that results in sufficient coupling into the high-speed Rx module 407. For this purpose, a portion of the light in the high-speed Rx module 407 is sent back to the high-speed Tx module 403 via the single-mode fiber 405B and the light detected at the Ge-PD 215A may be used as a control signal for the polarization launch manager 401. At the same time, the return signal carries a low-speed data as integrated by the low-speed modulator 221.

In an additional embodiment, the single-polarization grating coupler 217C may replace the polarization launch manager 401 and the polarization splitting grating couplers 425A on the Tx module 403, and in turn the polarization launch manager 401 and the polarization splitting grating couplers 425A may replace the single-polarization grating coupler 217C on the Tx module 407. In this configuration, the polarization launch manager may act as a combiner and can be controlled using the photocurrent from the Ge-PD 215B.

Figure 5:
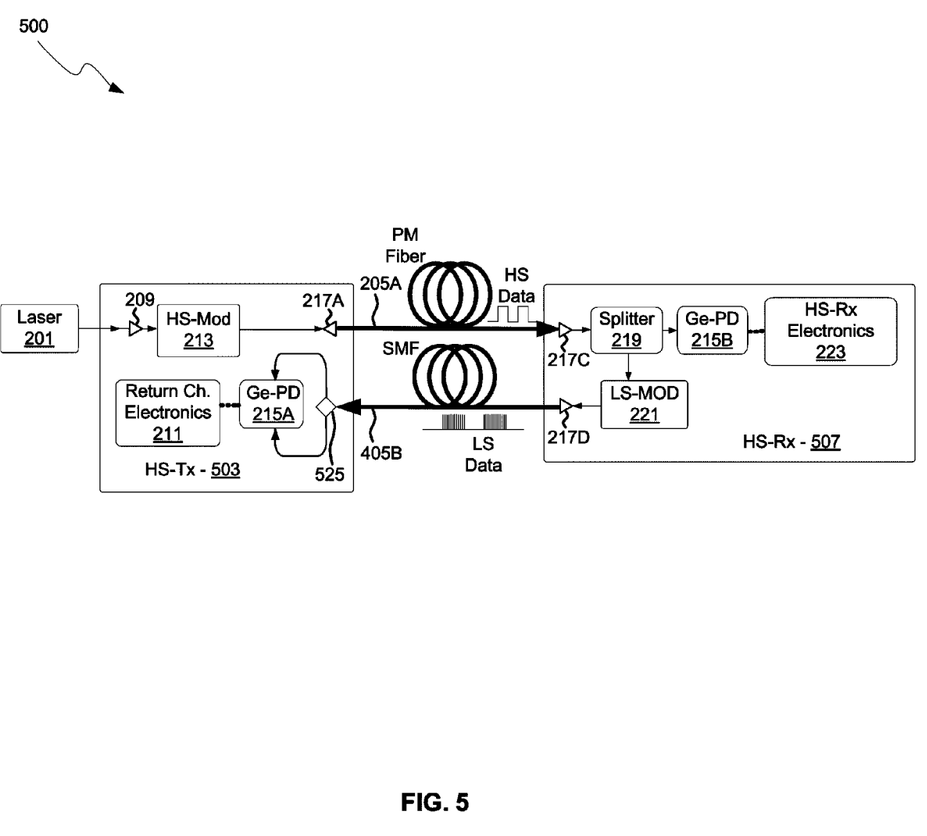
FIG. 5 is a block diagram of a single laser bidirectional link with a single-mode fiber and a polarization-maintaining fiber, in accordance with an embodiment of the invention.

FIG. 5 is a block diagram of a single laser bidirectional link with a single-mode fiber and a polarization-maintaining fiber, in accordance with an embodiment of the invention. Referring to FIG. 5, there is shown the laser 201, a high-speed Tx module 503, the single-mode fiber 205A, the polarization-maintaining fiber 405B, and a high-speed Rx module 507. Each of the modules may be similar to the modules described previously, but with different components.

The high-speed Tx module 503 comprises the single-polarization grating coupler 209, the high-speed modulator 213, the return high-speed electronics module 211, the Ge-PD 215A, the single-polarization grating coupler 217A, and a polarization-splitting grating coupler 525.

The high-speed Rx module 507 comprises the single-polarization grating couplers 217C and 217D, the splitter 219, the Ge-PD 215B, the low-speed modulator 221, and the high-speed Rx electronics module 223.

In operation, the laser 201 may communicate an optical signal to the CMOS chip comprising the Tx optical, optoelectronic, and electronic devices of the high-speed Tx module 503 via the grating coupler 209. The received optical signal may be modulated utilizing the high-speed modulator 213, thereby incorporating data into the optical signal and generating a high-speed data signal. The high speed data signal may be communicated from the high-speed Tx module 503 to the high-speed Rx module 507 via the polarization-maintaining fiber 205A.

The grating coupler 217C may couple the received high-speed data signal to the splitter 219, which may couple a portion of the received signal to the low-speed modulator 221 and the remaining signal to the Ge-PD 215B. The Ge-PD 215B may convert the received optical signal into an electrical signal that may be received and processed by the high-speed Rx electronics module 223. In this manner, data may be communicated at high data rates from the high-speed Tx module 503 to the high-speed Rx module 507.

The low-speed modulator 221 may receive the high-speed data signal from the splitter 219 and modulate a low-speed data signal over the high-speed data signal, thereby generating a low-speed data signal. The low-speed data signal therefore comprises periods of bursts (1's) and no bursts (0's), and may be communicated to the single-mode fiber 405B via the grating coupler 217D.

The low-speed data signal may then be communicated from the high-speed Rx module 507 to the high-speed Tx module 503. The low-speed data signal may be coupled into the high-speed Tx module 503 via the polarization-splitting grating coupler 525 and converted to an electrical signal by the Ge-PD 215A. The electrical signal generated by the Ge-PD 215A may be communicated to the return channel electronics module 211 for processing thereby generating a bidirectional link utilizing a single laser, the laser 201, a polarization-maintaining fiber 205A and single-mode fiber 504B.

Figure 6:
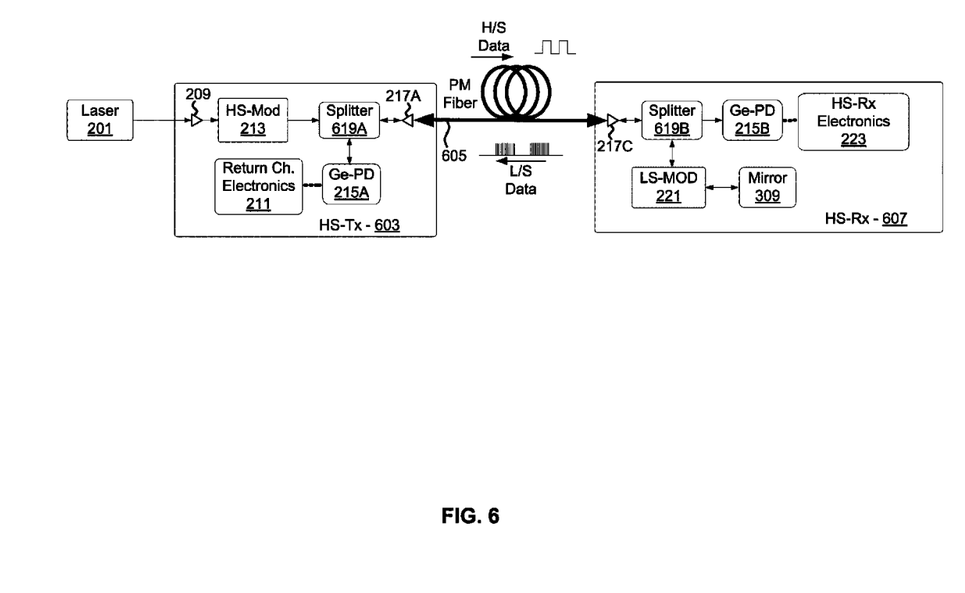
FIG. 6 is a block diagram of a single laser bidirectional link with a single polarization-maintaining fiber, in accordance with an embodiment of the invention.

FIG. 6 is a block diagram of a single laser bidirectional link with a single polarization-maintaining fiber, in accordance with an embodiment of the invention. Referring to FIG. 6, there is shown the laser 201, a high-speed Tx module 603, a polarization-maintaining fiber 605, and a high-speed Rx module 607. Each of the modules may be similar to the modules described previously, but with different components and fiber coupling configuration.

The high-speed Tx module 603 comprises the single-polarization grating coupler 209, the high-speed modulator 213, the return high-speed electronics module 211, the Ge-PD 215A, a splitter 619A, and the single-polarization grating coupler 217A.

The high-speed Rx module 607 comprises the single-polarization grating coupler, a splitter 619B, the Ge-PD 215B, the low-speed modulator 221, the mirror 309, and the high-speed Rx electronics module 223.

The splitters 619A and 619B may comprise optical splitters, for example, directional couplers, thereby directing optical in different paths depending on the direction of travel through the splitter. For example, the splitter 619A may be operable to direct the optical signal received from the high-speed modulator 213 to the single-polarization grating coupler 217A, and direct an optical signal received from the single-polarization grating coupler 217A to the Ge-PD 215A.

In operation, the laser 201 may communicate an optical signal to the CMOS chip comprising the Tx optical, optoelectronic, and electronic devices of the high-speed Tx module 603 via the grating coupler 209. The received optical signal may be modulated utilizing the high-speed modulator 213, thereby incorporating data into the optical signal and generating a high-speed data signal that may pass through the splitter 619A with minimal loss. The high speed data signal may be communicated from the high-speed Tx module 603 to the high-speed Rx module 607 via the polarization-maintaining fiber 605.

The grating coupler 217C may couple the received high-speed data signal to the splitter 619B, which may couple a portion of the received signal to the low-speed modulator 221 and the remaining signal to the Ge-PD 215B. The Ge-PD 215B may convert the received optical signal into an electrical signal that may be received and processed by the high-speed Rx electronics module 223. In this manner, data may be communicated at high data rates from the high-speed Tx module 603 to the high-speed Rx module 607.

The low-speed modulator 221 may receive the high-speed data signal from the splitter 619B and modulate a low-speed data signal over the high-speed data signal. The modulated signal therefore comprises periods of bursts (1's) and no bursts (0's) that may be communicated to the mirror 309, reflected back to the low-speed modulator 221 for further modulation, thereby generating a low-speed data signal. The low-speed data signal may be communicated to the polarization-maintaining fiber 605 via the splitter 619B and the grating coupler 217C.

The low-speed data signal may then be communicated from the high-speed Rx module 607 to the high-speed Tx module 603. The low-speed data signal may be coupled into the high-speed Tx module 603 via the single-polarization grating coupler 217A, directed to the Ge-PD by the splitter 619A and converted to an electrical signal by the Ge-PD 215A. The electrical signal generated by the Ge-PD 215A may be communicated to the return channel electronics module 211 for processing thereby generating a bidirectional link utilizing a single laser, the laser 201, and a single polarization-maintaining fiber 605.

Figure 7:
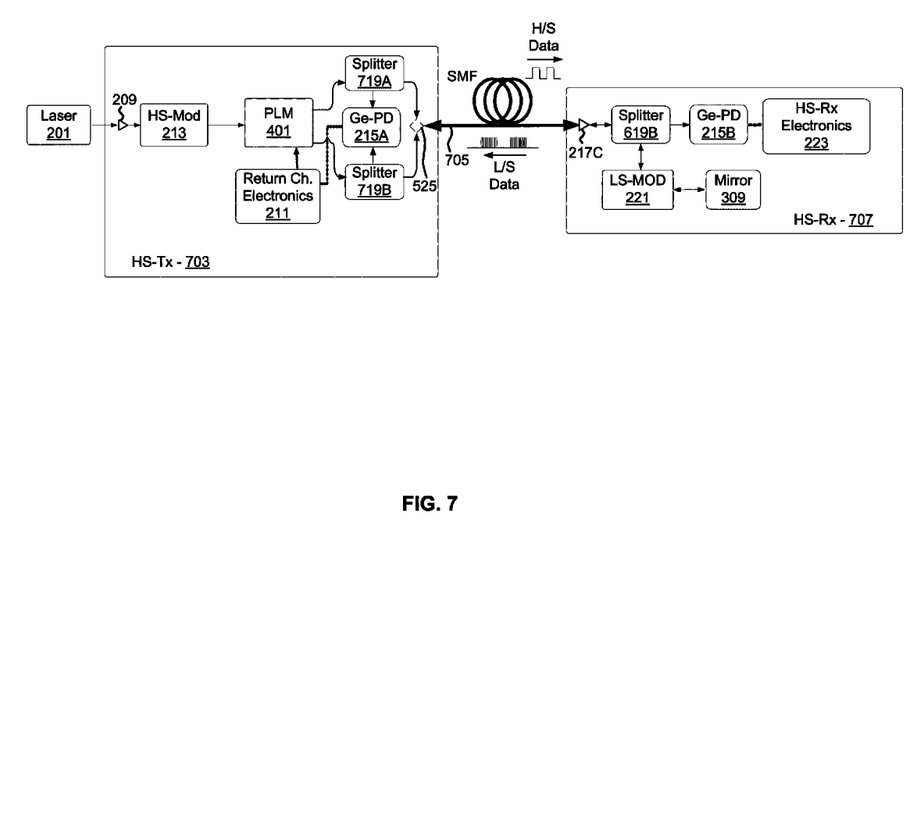
FIG. 7 is a block diagram of a single laser bidirectional link with a single single-mode fiber, in accordance with an embodiment of the invention

FIG. 7 is a block diagram of a single laser bidirectional link with a single single-mode fiber, in accordance with an embodiment of the invention. Referring to FIG. 7, there is shown the laser 201, a high-speed Tx module 703, a single-mode fiber 705, and a high-speed Rx module 707. Each of the modules may be similar to the modules described previously, but with different components and fiber coupling configurations.

The high-speed Tx module 703 comprises the single-polarization grating coupler 209, the high-speed modulator 213, the return high-speed electronics module 211, the Ge-PD 215A, the polarization launch manager 401, splitters 719A and 719B, and the polarization-splitting grating coupler 525.

The high-speed Rx module 707 comprises the single-polarization grating coupler 217C, the splitter 619B, the Ge-PD 215B, the low-speed modulator 221, the mirror 309, and the high-speed Rx electronics module 223.

In operation, a CW optical signal may be communicated to the high-speed Tx module 703 via the grating coupler 209. The received optical signal may be modulated by the high-speed modulator 213 and the resulting high-speed data signal may be communicated to the polarization launch manager 401, which may split the received optical signal into two paths and control the amplitude and phase of the two paths. The two output signals of the polarization launch manager 401 may be communicated to the splitters 719A and 719B to provide a return path for a low-speed data signal received from the high-speed Rx module 707. The optical signal to be communicated to the high-speed Rx module 707 may be communicated to the polarization-splitting grating coupler 525 for coupling to the single-mode fiber 705.

As the light is coherent, the two light beams will interfere and create an uncontrolled polarization state on the Poincare-sphere at the single-polarization grating coupler 217C. A polarization state may be launched from the high-speed Tx module 703 that results in sufficient coupling into the high-speed Rx module 707. For this purpose, a portion of the light in the high-speed Rx module 707 may be sent back to the high-speed Tx module 703 via the single-mode fiber 705 and the light detected at the Ge-PD 215A may be used as a control signal for the polarization launch manager 401. At the same time, the return signal carries a low-speed data as integrated by the low-speed modulator 221.

The grating coupler 217C may couple the received high-speed data signal to the splitter 619B, which may couple a portion of the received signal to the low-speed modulator 221 and the remaining signal to the Ge-PD 215B. The Ge-PD 215B may convert the received optical signal into an electrical signal that may be received and processed by the high-speed Rx electronics module 223. In this manner, data may be communicated at high data rates from the high-speed Tx module 703 to the high-speed Rx module 707.

The low-speed modulator 221 may receive the high-speed data signal from the splitter 619B and modulate a low-speed data signal over the high-speed data signal. The modulated signal therefore comprises periods of bursts (1's) and no bursts (0's) that may be communicated to the mirror 309, reflected back to the low-speed modulator 221 for further modulation, thereby generating a low-speed data signal. The low-speed data signal may be communicated to the single-mode fiber 705 via the splitter 619B and the grating coupler 217C.

The low-speed data signal may then be communicated from the high-speed Rx module 707 to the high-speed Tx module 703. The low-speed data signal may be coupled into the high-speed Tx module 703 via the polarization-maintaining grating coupler 525, with each output communicated to the splitters 719A and 719B, which may direct the coupled low-speed data signal to the Ge-PD 215A for conversion to an electrical signal. The electrical signal generated by the Ge-PD 215A may be communicated to the return channel electronics module 211 for processing thereby generating a bidirectional link utilizing a single laser, the laser 201, and a single single-mode fiber 705. In addition, the electrical signal generated by the Ge-PD 215A may be utilized by the return channel electronics module 211 to control the polarization launch manager 401 for optimum signal strength.

Figure 8:
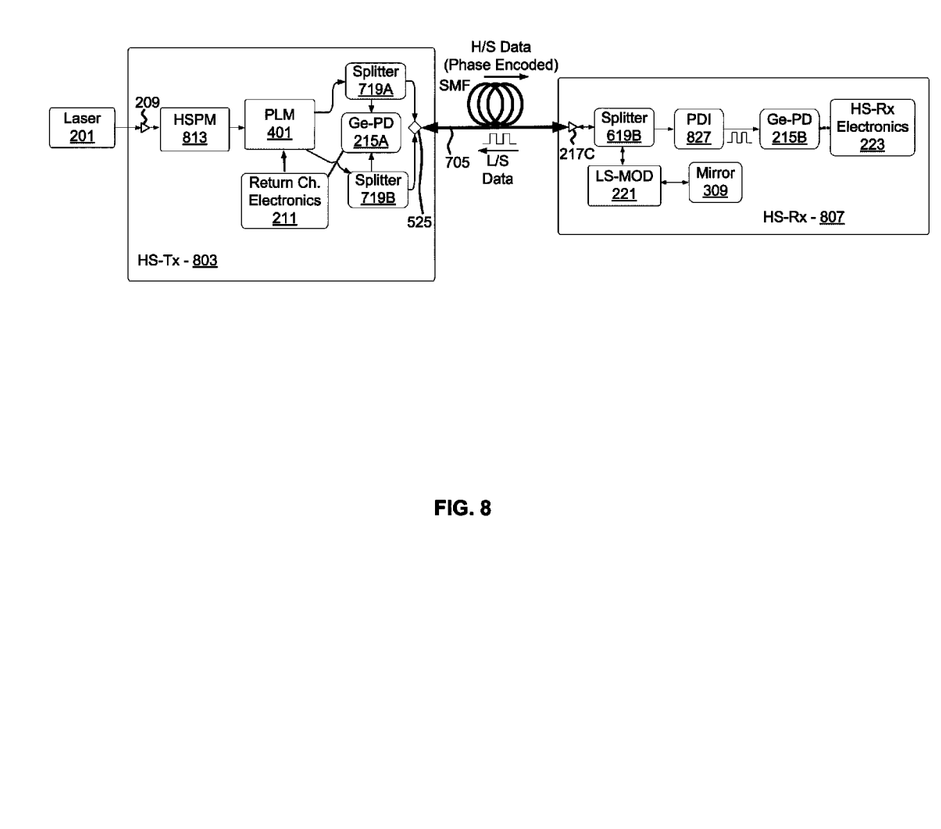
FIG. 8 is a block diagram of a single laser bidirectional link with phase encoding and a single single-mode fiber, in accordance with an embodiment of the invention.

FIG. 8 is a block diagram of a single laser bidirectional link with phase encoding and a single single-mode fiber, in accordance with an embodiment of the invention. Referring to FIG. 8, there is shown the laser 201, a high-speed Tx module 803, a single-mode fiber 705, and a high-speed Rx module 807. Each of the modules may be similar to the modules described previously, but with different components, fiber coupling configurations, and encoding techniques. For high-rate digital transmission systems, such as 40G and 100G, amplitude modulation may be replaced by phase modulation such PSK or QPSK, for example.

The high-speed Tx module 803 comprises the single-polarization grating coupler 209, a high-speed phase modulator 813, the return high-speed electronics module 211, the Ge-PD 215A, the polarization launch manager 401, splitters 719A and 719B, and the polarization-splitting grating coupler 525.

The high-speed Rx module 807 comprises the single-polarization grating coupler 217C, the splitter 619B, the Ge-PD 215B, the low-speed modulator 221, the mirror 309, a phase-decoding interferometer 827, and the high-speed Rx electronics module 223.

The high-speed phase modulator 813 may modulate the phase of a received signal as opposed to the amplitude. Accordingly, the received signal may be an oscillating signal, such as from a laser operated at a desired oscillation frequency. In this manner, a phase encoded signal may be communicated via the optical fiber as opposed to an amplitude modulated signal.

The phase-decoding interferometer 827 may comprise a multi-arm interferometer with a long delay line in one arm that may be operable to delay one arm by one bit, thereby generating an amplitude modulated signal. In addition, the high-speed Rx electronics module 223 comprises circuitry for supporting phase-shift keying (PSK).

In operation, an optical signal may be communicated to the high-speed Tx module 803 via the grating coupler 209. The received optical signal may be modulated by the high-speed phase modulator 213 and the resulting high-speed phase-encoded data signal may be communicated to the polarization launch manager 401, which may split the received optical into two paths and control the phase of the signal in the two paths. The two output signals of the polarization launch manager 401 may be communicated to the splitters 719A and 719B to provide a return path for a low-speed data signal received from the high-speed Rx module 807. The optical signal to be communicated to the high-speed Rx module 807 may be communicated to the polarization-splitting grating coupler 525 for coupling to the single-mode fiber 705.

As the light is coherent, the two light beams will interfere and create an uncontrolled polarization state on the Poincare-sphere at the single-polarization grating coupler 217C. A polarization state may be launched from the high-speed Tx module 803 that results in sufficient coupling into the high-speed Rx module 807. For this purpose, a portion of the light in the high-speed Rx module 807 may be sent back to the high-speed Tx module 803 via the single-mode fiber 705 and the light detected at the Ge-PD 215A may be used as a control signal for the polarization launch manager 401. At the same time, the return signal carries a low-speed data as integrated by the low-speed modulator 221.

The grating coupler 217C may couple the received high-speed data signal to the splitter 619B, which may couple a portion of the received signal to the low-speed modulator 221 and the remaining signal to the phase-decoding interferometer 827 which may convert the phase-encoded optical signal to an amplitude modulated signal before communicating the result to the Ge-PD 215B. The Ge-PD 215B may convert the received optical signal into an electrical signal that may be received and processed by the high-speed Rx electronics module 223. In this manner, data may be communicated at high data rates from the high-speed Tx module 803 to the high-speed Rx module 807.

The low-speed modulator 221 may receive the high-speed data signal from the splitter 619B and modulate a low-speed data signal over the high-speed data signal. The modulated signal therefore comprises periods of bursts (1's) and no bursts (0's) that may be communicated to the mirror 309, reflected back to the low-speed modulator 221 for further modulation, thereby generating a low-speed data signal. The low-speed data signal may be communicated to the single-mode fiber 705 via the splitter 619B and the grating coupler 217C.

The low-speed data signal may then be communicated from the high-speed Rx module 807 to the high-speed Tx module 803. The low-speed data signal may be coupled into the high-speed Tx module 803 via the polarization-maintaining grating coupler 525, with each output communicated to the splitters 719A and 719B, which may direct the coupled low-speed data signal to the Ge-PD 215A for conversion to an electrical signal. The electrical signal generated by the Ge-PD 215A may be communicated to the return channel electronics module 211 for processing thereby generating a bidirectional link utilizing a single laser, the laser 201, and a single single-mode fiber 705. In addition, the electrical signal generated by the Ge-PD 215A may be utilized by the return channel electronics module 211 to control the polarization launch manager 401 for optimum signal strength.

Figure 9:
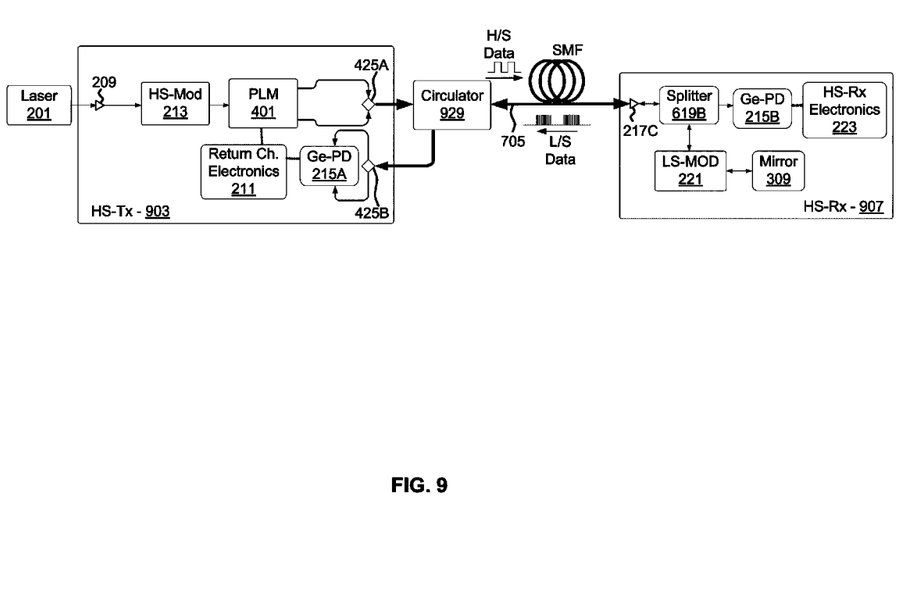
FIG. 9 is a block diagram of a single laser bidirectional link with an external circulator and a single single-mode fiber, in accordance with an embodiment of the invention.

FIG. 9 is a block diagram of a single laser bidirectional link with an external circulator and a single single-mode fiber, in accordance with an embodiment of the invention. Referring to FIG. 9, there is shown the laser 201, a high-speed Tx module 903, a single-mode fiber 705, a high-speed Rx module 907, and a circulator 929. Each of the modules may be similar to the modules described previously, but with different components and fiber coupling configurations.

The high-speed Tx module 903 comprises the single-polarization grating coupler 209, the high-speed modulator 213, the return high-speed electronics module 211, the Ge-PD 215A, the polarization launch manager 401, and the polarization-splitting grating couplers 425A and 425B.

The circulator 929 may comprise a directional splitter, in that optical signals travelling from the high-speed Rx module 903 may pass through the circulator 929 towards the single-polarization grating coupler 217C, whereas optical signals travelling from the high-speed Rx module 907 may be directed to the polarization-splitting grating coupler 425B in the high-speed Tx module 903. The circulator 929 may utilize the Faraday effect, for example to obtain these directional capabilities.

The high-speed Rx module 907 comprises the single-polarization grating coupler 217C, the splitter 619B, the Ge-PD 215B, the low-speed modulator 221, the mirror 309, and the high-speed Rx electronics module 223.

In operation, a CW optical signal may be communicated to the high-speed Tx module 903 via the grating coupler 209. The received optical signal may be modulated by the high-speed modulator 213 and the resulting high-speed data signal may be communicated to the polarization launch manager 401, which may split the received optical into two paths and control the phase of the signal in the two paths. The two output signals of the polarization launch manager 401 may be communicated to the polarization-splitting grating coupler 425A for coupling to the single-mode fiber 705.

As the light is coherent, the two light beams will interfere and create an uncontrolled polarization state on the Poincare-sphere at the single-polarization grating coupler 217C. A polarization state may be launched from the high-speed Tx module 903 that results in sufficient coupling into the high-speed Rx module 907. For this purpose, a portion of the light in the high-speed Rx module 907 may be sent back to the high-speed Tx module 903 via the single-mode fiber 705 and the light detected at the Ge-PD 215A may be used as a control signal for the polarization launch manager 401. At the same time, the return signal carries a low-speed data as integrated by the low-speed modulator 221.

The grating coupler 217C may couple the received high-speed data signal to the splitter 619B, which may couple a portion of the received signal to the low-speed modulator 221 and the remaining signal to the Ge-PD 215B. The Ge-PD 215B may convert the received optical signal into an electrical signal that may be received and processed by the high-speed Rx electronics module 223. In this manner, data may be communicated at high data rates from the high-speed Tx module 903 to the high-speed Rx module 907.

The low-speed modulator 221 may receive the high-speed data signal from the splitter 619B and modulate a low-speed data signal over the high-speed data signal. The modulated signal therefore comprises periods of bursts (1's) and no bursts (0's) that may be communicated to the mirror 309, reflected back to the low-speed modulator 221 for further modulation, thereby generating a low-speed data signal. The low-speed data signal may be communicated to the single-mode fiber 705 via the splitter 619B and the grating coupler 217C.

The low-speed data signal may then be communicated from the high-speed Rx module 707 to the high-speed Tx module 903 via the circulator 929. The low-speed data signal may be coupled into the high-speed Tx module 703 via the polarization-maintaining grating coupler 425B, with each output communicated to the Ge-PD 215A for conversion to an electrical signal. The electrical signal generated by the Ge-PD 215A may be communicated to the return channel electronics module 211 for processing, thereby generating a bidirectional link utilizing a single laser, the laser 201, and a single single-mode fiber 705. In addition, the electrical signal generated by the Ge-PD 215A may be utilized by the return channel electronics module 211 to control the polarization launch manager 401 for optimum signal strength.

In an embodiment of the invention, a method and system are disclosed for single laser bidirectional links. Aspects of the invention may comprise communicating a high speed optical signal from a transmit CMOS photonics chip 130, 203, 303, 403, 503, 603, 703, 803, and/or 903 to a receive CMOS photonics chip 130, 207, 307, 407, 507, 607, 807, and/or 907 and communicating a low-speed optical signal from the receive CMOS photonics chip 130, 207, 307, 407, 507, 607, 807, and/or 907 to the transmit CMOS photonics chip 130, 203, 303, 403, 503, 603, 703, 803, and/or 903 via one or more optical fibers 205A, 205B, 405A, 405B, 605, and/or 705. The optical signals may be coupled to and from the CMOS photonics chips utilizing single-polarization grating couplers. The optical signals may be coupled to and from the CMOS photonics chips 130, 203, 303, 403, 503, 603, 703, 803, 903, 130, 207, 307, 407, 507, 607, 807, and/or 907 utilizing polarization-splitting grating couplers 425A, 425B, and/or 525. The optical signals may be amplitude modulated or phase modulated. The one or more optical fibers 205A, 205B, 405A, 405B, 605, and/or 705 may comprise single-mode fibers 405A, 405B, and/or 705 or polarization-maintaining fibers 205A, 205B, and/or 605. A polarization of the high-speed optical signal may be configured before communicating the high-speed optical signal over the single-mode fibers 405A, 405B, and/or 705. The low-speed optical signal may be generated by modulating the received high-speed optical signal of from a portion of the received high-speed optical signal.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for processing signals, the method comprising:
   in a single laser bidirectional link comprising a transmit CMOS photonics chip, a single laser coupled to an input of the transmit CMOS photonics chip, a receive CMOS photonics chip, and first and second optical fibers coupling the transmit and receive CMOS photonic chips,
   wherein said transmit CMOS photonics chip comprises:
     a splitter coupled to the laser, and having first and second outputs;
     an optical modulator coupled to the first output of the splitter and having an output coupled to the first optical fiber,
     the second output of the splitter coupled to the second optical fiber, and
     a transmit-side photodetector coupled to the second optical fiber;
   and wherein the receive CMOS photonics chip comprises:
     a receive-side photodetector coupled to the first optical fiber; and
     an optical modulator having a first input/output port coupled to the second optical fiber and a second input/output port coupled to a mirror:
       communicating a first modulated optical signal from said transmit CMOS photonics chip to said receive CMOS photonics chip;
       communicating an unmodulated optical signal from said transmit CMOS photonics chip to said receive CMOS photonics chip; and
       communicating a second modulated optical signal from said receive CMOS photonics chip to said transmit CMOS photonics chip, wherein said second modulated optical signal is generated by modulating said communicated unmodulated optical signal in said receive CMOS photonics chip.

2. The method according to claim 1, comprising coupling said first and second modulated optical signals and said unmodulated optical signal to and from said CMOS photonics chips utilizing single-polarization grating couplers.

3. The method according to claim 1, comprising coupling said first and second modulated optical signals and said unmodulated optical signal to and from said CMOS photonics chips utilizing polarization-splitting grating couplers.

4. The method according to claim 1, comprising amplitude modulating optical signals for generating said first modulated optical signal and said second modulated optical signal.

5. The method according to claim 1, comprising generating said first modulated optical signal and/or said second modulated optical signal utilizing phase modulation.

6. The method according to claim 1, wherein said first and second optical fibers comprise single-mode fibers.

7. The method according to claim 6, comprising configuring a polarization of said first modulated optical signal before communicating said first modulated optical signal over said first single-mode fiber.

8. The method according to claim 1, wherein said first and second optical fibers comprise polarization-maintaining fibers.

9. The method according to claim 1, comprising generating said second modulated optical signal by modulating said unmodulated optical signal utilizing one or both of: a thermal phase modulator and a forward biased PIN diode modulator.

10. The method according to claim 1, comprising generating said unmodulated optical signal from a portion of a source optical signal that is also utilized to generate said first modulated optical signal.

11. A system for processing signals, the system comprising:
a single laser bidirectional link comprising a transmit CMOS photonics chip, a single laser coupled to an input of the transmit CMOS photonics chip, a receive CMOS photonics chip, and first and second optical fibers coupling the transmit and receive CMOS photonic chips,
wherein said transmit CMOS photonics chip comprises:
a splitter coupled to the single laser, and having first and second outputs;
an optical modulator coupled to the first output of the splitter and having an output coupled to the first optical fiber,
the second output of the splitter coupled to the second optical fiber, and
a transmit-side photodetector coupled to the second optical fiber;
wherein the receive CMOS photonics chip comprises:
a receive-side photodetector coupled to the first optical fiber; and
an optical modulator having a first input/output port coupled to the second optical fiber and a second input/output port coupled to a mirror;
and wherein said single laser bidirectional link is operable to:
communicate a first modulated optical signal from said transmit CMOS photonics chip to said receive CMOS photonics chip via the first optical fiber;
communicate an unmodulated optical signal from said transmit CMOS photonics chip to said receive CMOS photonics chip via the second optical fiber; and
communicate a second modulated optical signal from said receive CMOS photonics chip to said transmit CMOS photonics chip via the second optical fiber, wherein said second modulated optical signal is generated by modulating said communicated unmodulated optical signal in said receive CMOS photonics chip.

12. The system according to claim 11, wherein said single laser bidirectional link is operable to couple said first and second modulated optical signals and said unmodulated optical signal to and from said CMOS photonics chips utilizing single-polarization grating couplers.

13. The system according to claim 11, wherein said single laser bidirectional link is operable to couple said first and second modulated optical signals and said unmodulated optical signal to and from said CMOS photonics chips utilizing polarization-splitting grating couplers.

14. The system according to claim 11, wherein said single laser bidirectional link is operable to generate said first modulated optical signal and said second modulated optical signal utilizing amplitude modulation.

15. The system according to claim 11, wherein said single laser bidirectional link is operable to generate said first modulated optical signal and/or said second modulated optical signal utilizing phase modulation.

16. The system according to claim 11, wherein said first and second optical fibers comprise single-mode fibers.

17. The system according to claim 16, wherein said single laser bidirectional link is operable to configure a polarization of said first modulated optical signal before communicating said first modulated optical signal over said first single-mode fiber.

18. The system according to claim 11, wherein said first and second optical fibers comprise polarization-maintaining fibers.

19. The system according to claim 11, wherein said single laser bidirectional link is operable to generate said second modulated optical signal by modulating said communicated unmodulated optical signal utilizing one or both of: a thermal phase modulator and a forward biased PIN diode modulator.

20. The system according to claim 11, wherein said single laser bidirectional link is operable to generate said unmodulated optical signal from a portion of a source optical signal that is also utilized to generate said first modulated optical signal.

21. The method according to claim 10, wherein said source optical signal is generated by said single laser.

22. The method according to claim 20, wherein said source optical signal is generated by said single laser.

* * * * *